US009836477B2

(12) United States Patent
Bockus, Jr. et al.

(10) Patent No.: US 9,836,477 B2
(45) Date of Patent: *Dec. 5, 2017

(54) EVENT MEDIA FILE DISCOVERY (71) Applicant: International Business Machines Corporation, Armonk, NY (US)

(72) Inventors: Gordon W Bockus, Jr., Austin, TX (US); Mike A Bockus, Edmund, OK (US); Derek R Brewer, Bowling Green, OH (US); Robert D Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 711 days.

This patent is subject to a terminal disclaimer.

(21) Appl. No.: 13/919,178

(22) Filed: Jun. 17, 2013

(65) Prior Publication Data

US 2013/0346457 A1 Dec. 26, 2013

Related U.S. Application Data

(63) Continuation of application No. 13/246,140, filed on Sep. 27, 2011, now Pat. No. 8,903,953.

(51) Int. Cl.
*G06F 15/16* (2006.01)
*G06F 17/30* (2006.01)
*H04L 29/08* (2006.01)
*H04W 4/00* (2009.01)

(52) U.S. Cl.
CPC .. *G06F 17/30194* (2013.01); *G06F 17/30876* (2013.01); *H04L 67/18* (2013.01); *H04L 67/26* (2013.01); *H04W 4/00* (2013.01)

(58) Field of Classification Search
CPC ............. H04L 29/06891; H04L 9/0872; H04L 12/1845; H04L 12/5865
USPC .......................................................... 709/219
See application file for complete search history.

(56) References Cited

U.S. PATENT DOCUMENTS

| 5,751,956 A | 5/1998 | Kirsch |
| 5,963,915 A | 10/1999 | Kirsch |
| 6,466,966 B1 | 10/2002 | Kirsch et al. |
| 7,505,443 B2 | 3/2009 | McNew et al. |
| 7,756,928 B1 | 7/2010 | Meenan et al. |
| 7,886,043 B1 | 2/2011 | Chan et al. |
| 2002/0143629 A1 | 10/2002 | Mineyama et al. |
| 2005/0289453 A1* | 12/2005 | Segal ..................... G06F 1/12 715/203 |
| 2007/0233736 A1* | 10/2007 | Xiong ................... G06Q 30/02 |

(Continued)

FOREIGN PATENT DOCUMENTS

EP 2348423 A2 7/2011

OTHER PUBLICATIONS

SM Rahman, Final Office Action U.S. Appl. No. 13/246,140, dated Dec. 19, 2013.

(Continued)

*Primary Examiner* — S M Rahman
(74) *Attorney, Agent, or Firm* — Steven Bennett; Robert C. Rolnik (57) ABSTRACT

A computer implemented method and computer program product provides for announcing file availability. A source device receives a uniform resource locator (URL). The source device reports the URL, the URL corresponding to an event and to a network addressable server.

15 Claims, 6 Drawing Sheets (56) References Cited

U.S. PATENT DOCUMENTS

| | | | |
|---|---|---|---|
| 2009/0280907 A1* | 11/2009 | Larsen | G06F 8/60 |
| | | | 463/42 |
| 2009/0281897 A1 | 11/2009 | Antos | |
| 2009/0323555 A1 | 12/2009 | Lancaster et al. | |
| 2011/0251895 A1 | 10/2011 | Bladel | |
| 2012/0124618 A1* | 5/2012 | Ruiz-Velasco | G06Q 30/0241 |
| | | | 725/32 |
| 2012/0214443 A1* | 8/2012 | Daigle | H04L 9/3228 |
| | | | 455/411 |
| 2013/0136253 A1* | 5/2013 | Liberman Ben-Ami | H04M 3/5191 |
| | | | 379/265.09 |
| 2014/0207724 A1* | 7/2014 | Ledenev | G06F 21/316 |
| | | | 706/47 |

OTHER PUBLICATIONS

SM Rahman, Office Action U.S. Appl. No. 13/246,140, dated Apr. 4, 2014.
SM Rahman, Notice of Allowance U.S. Appl. No. 13/246,140, dated Jul. 25, 2014.
Anonymous, Jan. 2009, HTTP://www.eventphotoexchange.com/howitworks.aspx Archive download.
Robert Wilhelm, Jul. 9, 2007, System and method for sharing digital photographs over a wireless network.

\* cited by examiner

EVENT MEDIA FILE DISCOVERY

BACKGROUND

The present invention relates to a computer implemented method and computer program product for disseminating information and more specifically to locating files that correspond to an event.

Professional and casual photographers who use digital photography can upload photos to websites in the form of media files. A media file is a photo, video, or sound recording that stores visual and/or sound data in a digital encoding format in common use. Such digital encoding formats include, for example, mp3, jpeg, *.mov encoding schemes or file types. Many commercial servers or web hosts are available to host photos. During an event, such as a school play, there can be many photographers that film or otherwise take pictures. Sometimes those in attendance at the event or interested in the event would like to view or even copy photos and other media of the event. If a person desires pictures from the event then that person would first have to find out which people are actually intending to post photos onto a server and then discover the uniform resource locator (URL) that is to be used.

However, in some cases, even those photographers who intend to upload photos are unsure of the exact URL. Moreover, those who are recording video may prefer not to hold a conversation with someone who would like a copy of the later-shared video. This reticence is due to the desire to not disturb others who attend the event as well as the desire to avoid adding unwanted dialog to the recording.

Accordingly, a remedy to the situation is needed.

BRIEF SUMMARY

According to one embodiment of the present invention a computer implemented method and computer program product provide for announcing file availability. A source device receives a uniform resource locator (URL) corresponding both to an event and to a network addressable server. The source device reports the URL, the URL corresponding to an event and to a network addressable server.

According to one embodiment of the present invention a computer implemented method and computer program product announces a URL. A source device receives user input describing the uniform resource locator. The source device wirelessly transmits a service set identifier (SSID) comprising the uniform resource locator as a wireless identifier.

DETAILED DESCRIPTION

Figure 1:
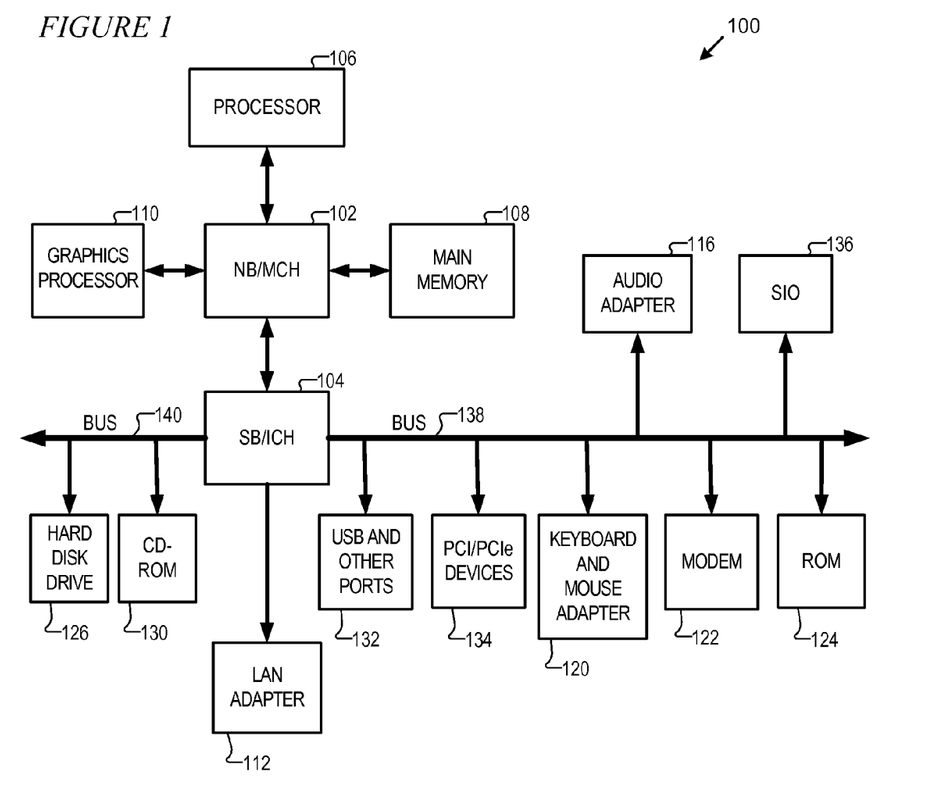
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the embodiments can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, one or more embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage device(s) may be utilized. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer-readable storage device" does not encompass a signal propagation media such as a copper cable, optical fiber or wireless transmission media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2A:
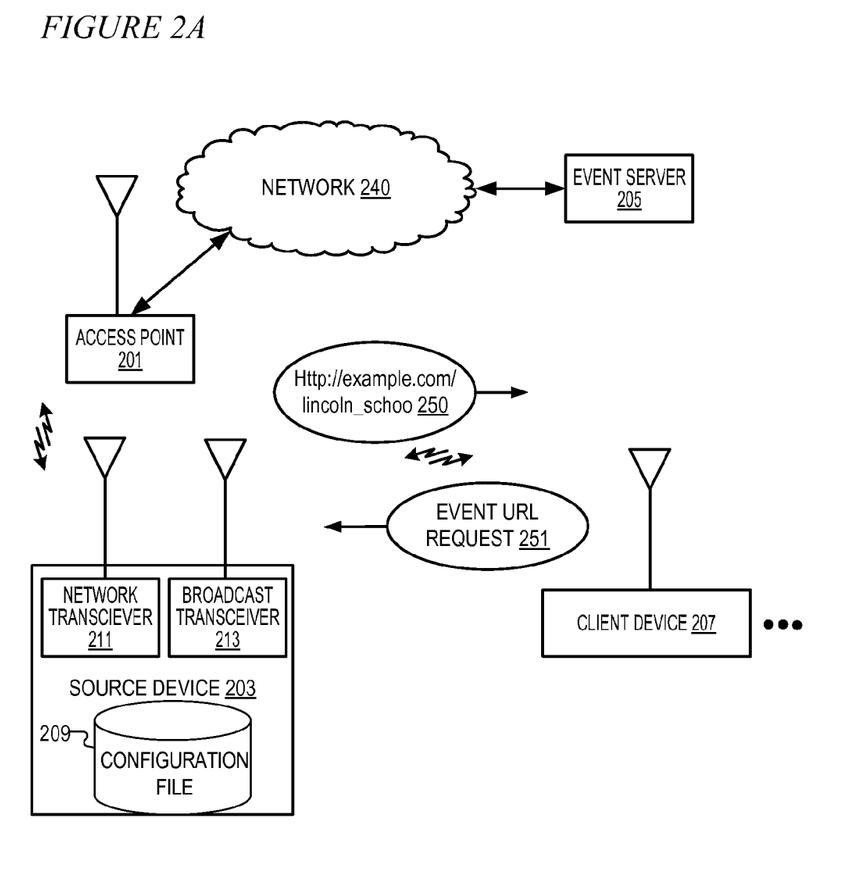
FIG. 2A is a block diagram of devices and supporting devices at an event in accordance with an illustrative embodiment of the invention.

FIG. 2A is a block diagram of devices and supporting devices at an event in accordance with an illustrative embodiment of the invention. Users of computing equipment may attend an event. The users may carry devices, such as source device 203 or client device 207. A source device is a device that either broadcasts an event uniform resource locator (URL) or responds to requests for the event URL by providing a configuration file including at least the event URL within the configuration file.

The source device has a broadcast transceiver 213 that operates using one or more wireless protocols to provide a wireless identifier. A wireless identifier identifies a wireless device and may optionally encode an URL. Wireless routers, for example, broadcast their availability via a service set identifier (SSID), which identifies the network, for example, using the IEEE (Institute of Electrical and Electronics Engineers) wireless standards such as 802.11b, 802.11g, 802.11n and the like. Computing devices scan for the availability of an SSID and then are able to connect to the network via this initial contact. It is appreciated that in addition to IEEE standard Wi-Fi™ transceivers, a Bluetooth® transceiver can be operated as the broadcast transceiver. Wi-Fi is a trademark of the Wi-Fi Alliance. Bluetooth is a trademark owned by Bluetooth SIG, Inc. A Bluetooth protocol is a protocol (identifier) defined by the Bluetooth Special Interest Group.

Source device 203 may have a network transceiver 211, which can be used to connect to wireless infrastructure such as access point 201 (also known as wireless routers) and further to devices accessible via network 240, such as, for example, event server 205. Source device 203 may include configuration file 209. Configuration file 209 can be data stored to memory or non-volatile storage. The configuration file may contain information previously entered by a user of the source device. Alternatively, the configuration file may be populated with information that is automatically obtained, for example, via global positioning satellites (GPS) or similar wireless location sensing.

Source device 203 may further communicate with client device 207. Client device 207 is a device operated, for example, by a user who desires to obtain details about how to access photos and other media during or following the event. Accordingly, client device 207 may obtain event URL information from the transmissions of the source device 203. The client device can obtain the URL in one of two schemes. First, if the URL is compact enough to be described in the SSID and the client device is within receiving range of the video source device 203, the client device passively receives the event URL, explained below, and stores it for later use. In this scheme, the source device transmits the event URL in periodic, unsolicited SSID packets, such as, for example, one containing, "http://example.com/lincoln_schoo" 250. A reason for using the SSID as a vehicle to contain the URL is that the SSID is frequently broadcast according to the IEEE 802.11n and related standards.

Second, if the URL is not sufficiently compact the URL can be stored in the configuration file and generated as a response to event URL request 251. The event URL request can be generated by the client device responsive to the desires of the owner to obtain and retain an URL available from a source device within range of client device 207. Accordingly, in many cases, the limited receive-sensitivity of the client device coupled with the limited range of the source device radio communications limits the number of source devices that will be accessible during an event to the client device. As such, the client device is not exposed to the full universe of currently ongoing events, thereby producing a user experience that permits a rapid selection of the desired event, where conflicting events might be broadcast by conflicting source devices that are incidentally detectable.

An event URL corresponds to an event. Some events can have multiple URLs that correspond to it. An event is a bounded geographic area, and may also include time limitations, such as a beginning time and ending time. In other words, a predetermined time can be used as a way of describing the event, where the predetermined time at least has a beginning and optionally an end. As for a bounded geographic area, the area can be small or large. For example, the area can be an enclosed space such as a classroom. Alternatively, the bounded geographic area can be a stadium or open-air concert venue.

A bounded geographic area may be described either geometrically or symbolically. If the bounded geographic area is described geometrically, it can be described using latitudes and longitudes, or global positioning satellite (GPS) descriptions, or the like, by describing circles, polygons and the like on the Earth's surface, or elevation from the Earth's surface. The bounded geographic area can be described symbolically using, for example, addresses, names of commercial buildings or other structures.

If source device 203 includes a photo or other media recorder, the source device may be called a video source device. Optional equipment of the source device can include network transceiver 211, which may permit real-time or delayed upload of media files obtained during the event, for example, to the event server. In addition, location information concerning where the source device is located may be inferred from the network transceiver detecting one or more access point's SSIDs that are known to be at specific geographic coordinates and/or elevations. As can be appreciated, the further use of a GPS transceiver, not shown, can further refine the location of the source device. As described, location information can be received through the decoding of one or more SSIDs or obtaining GPS satellite signals. These are merely two examples of receiving location information. It is appreciated that the source device need not be connected by wire to a GPS device. For example, a GPS device may process GPS satellite signals and calculate latitudes and longitudes that may be reported to the source device through a wireless protocol.

Figure 2B:
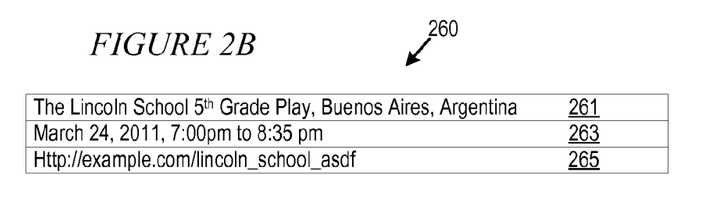
FIG. 2B is a configuration file in accordance with an illustrative embodiment of the invention.

FIG. 2B is a configuration file in accordance with an illustrative embodiment of the invention. The configuration file can include an event description. An event description is a human language description of the event, whether in native form or encoded to a digital format. The event description can be recorded to a digital medium, for example hard disk drive 126 of FIG. 1. Configuration file 260 can exist entirely in memory as a data structure and may be further described using the conventions of XML or other markup languages. Configuration file 260 describes a structure as well as other details in event location 261. Accordingly, event location 261 describes a bounded geographic area.

Predetermined time 263 describes, in conventional United States format, a time period. As can be appreciated, the end time of an event can be a planned or forecasted end time. For some events, such as a college-level physics class, the time of concluding the event is a routine duration after the beginning of the event. Thus, a predetermined time can omit a ending time. Additionally, the predetermined time can merely estimate a time for the event to conclude.

Uniform Resource Locator (URL) 265 is an address of the server that a photographer or other documentary person can use to host photos, videos, sound recordings and the like for the event. URL 265 can operate as an event URL. Nevertheless, it may be convenient for the operation of event server 205 of FIG. 2A, which may host files for the event, to redirect http requests to a secondary URL. Accordingly, an event URL can be an indirect reference to the actual URL. This arrangement can be convenient if a shorter URL is desired in URL 265. In either case, the URL corresponds to an event and to a network addressable server. Importantly, a client that uses the URL to make HTTP requests and other file requests can resolve the URL, through the indirection just described, as well as use domain name service (DNS), to obtain the internet protocol address assigned to the server. Moreover, an event server may use any manner of load balancing to assign the task of serving HTTP requests to one among several distinct network nodes, that, logically cooperate together to serve a plurality of HTTP requests.

Some embodiments may add to the configuration file an access code. Accordingly, even though the source device may transmit the configuration file responsive to any validly received request, the access code is still only available to the actual recipients of the wirelessly delivered configuration file and those to whom the recipients further disseminate the access code and/or event URL. An access code is a code that limits access. Further, an access code may initially be unpublished in that it is freely given to devices that, however, satisfy some minimal criteria. That minimal criteria can be that the requesting device be able to transmit a request that is received by the source device and further that the requesting device is also within range to receive a responsively transmitted configuration file having at least the access code. The access code corresponds to the event URL.

Figure 3A:
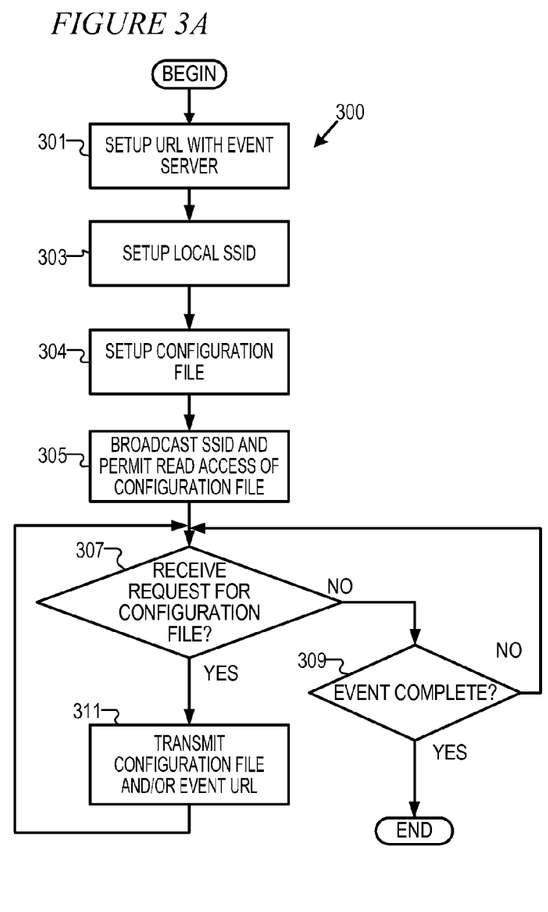
FIG. 3A is a flowchart of a process performed by a device in accordance with an illustrative embodiment of the invention.

FIG. 3A is a flowchart of a process performed by a device in accordance with an illustrative embodiment of the invention. Initially, a source device may set up an URL with an event server (step 301). Setting up the URL can include both the establishment of an URL that permits navigation to media files, for example, by presenting the media in summary form. Alternatively, the event server (accessed via the URL) can render all uploaded media files, for example, embedded in an HTML-encoded page, or using other convenient download mechanisms.

Next, the source device may setup a wireless identifier. A wireless identifier is a unique identifier of the source device for purposes of wireless signaling. For example, in the 802.11n standard, the service set identifier (SSID) is a unique identifier that identifies a particular 802.11 wireless LAN. Each access point or base station transmit the SSID periodically.

In the case when the wireless identifier is a service set identifier (SSID) according to an IEEE protocol, the source device may set up a local SSID (step 303). A local SSID is the SSID assigned to a broadcast transceiver, for example, broadcast transceiver 213 of FIG. 2A. The broadcast transceiver is electro-mechanically connected to the source device. However, unlike the IEEE 802.11 series protocols, some communication features may not be present. For example, the transmitting a wireless identifier may not include further details concerning network security and routing of packets to further internet-protocol-addressed devices. Similarly, protocols such as dynamic host configuration protocol may not necessarily be implemented by the access point, as these are not necessary for purposes of alerting nearby devices to the availability of an URL.

Setting up the SSID can be according to at least two schemes. The first scheme actually uses the URL of the event server (an event URL) as the SSID. In this scheme, the URL may be limited to 32 characters, such as, for example, http://example.com/lincoln_schoo. In this situation, the broadcasting of the SSID alone is an example of reporting an URL. The second scheme makes the SSID include at least a preset indicator, agreed upon by convention, that indicates the availability of an event URL that corresponds to the event. In other words, the preset indicator ensures that queries made to the source device will be provided responses that further identify the event URL. The preset indicator can be, for example, "QQQ". The steps of broadcast process 300 are according to the second scheme.

If the source device uses a Bluetooth transceiver as the broadcast transceiver, the wireless identifier can be a Universal Unique Identifier (UUID), according to a third scheme. A further fourth scheme can use the Media Access Control (MAC) address of the broadcast transceiver as a wireless identifier. A MAC address is according to the Institute of Electrical and Electronics Engineers (IEEE): MAC-48, EUI-48™, and EUI-64™ standards, incorporated by reference herein. EUI-48 and EUI-64 are trademarks of the IEEE.

Next, the source device may set up a configuration file (step 304). Setting up the configuration file can include an interactive session using a user-interface to obtain the details of the configuration file. The use of a configuration file is optional. However, at conventional user prompts, the user of the source device may enter the three types of information described in the configuration file, see FIG. 2B. Accordingly, as part of setting up the configuration file, the source device receives user input of an event description, which is reported wirelessly later. Next, the source device may broadcast the SSID and otherwise permit read access of the configuration file (step 305).

Next, the source device may receive a request for the configuration file (step 307). The request can be made by a client device carried by a guest to a wedding, in a case where the event is a wedding. In other words, a client device requests at least the uniform resource locator. Such a request may be called an event URL request. An event URL request is a radio transmitted packet that addresses the broadcast transceiver using the wireless identifier of the broadcast transceiver.

If no event URL request is received, the source device can determine if the event is complete (step 309). The source device makes the determination according to details previously entered by the user regarding end times and any standard durations that may apply to a given type of event. If the event is complete, processing terminates. However, if the event is not yet complete processing returns to step 307.

A positive determination that an event URL request occurred may cause the source device to transmit the configuration file and optionally the event URL (step 311). Step 311 is an example of reporting an URL. In addition, step 311 may report the user input obtained earlier at step 304. Next, processing resumes at step 307.

Figure 3B:
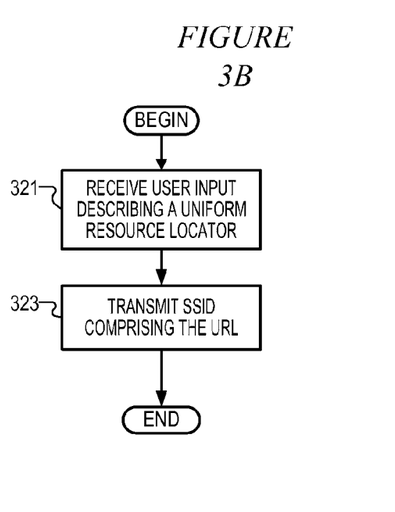
FIG. 3B is an alternative flowchart of a process performed by a device in accordance with an illustrative embodiment of the invention.

FIG. 3B is an alternative flowchart of a process performed by a device in accordance with an illustrative embodiment of the invention. Initially, the source device may receive user-input describing the URL (step 321). Next, the source device may transmit an SSID or other wireless identifier that comprises the URL (step 323). Step 323 can be iteratively performed. Processing may terminate thereafter, or in accordance with the timed operation possibly specified by the user.

Figure 3C:
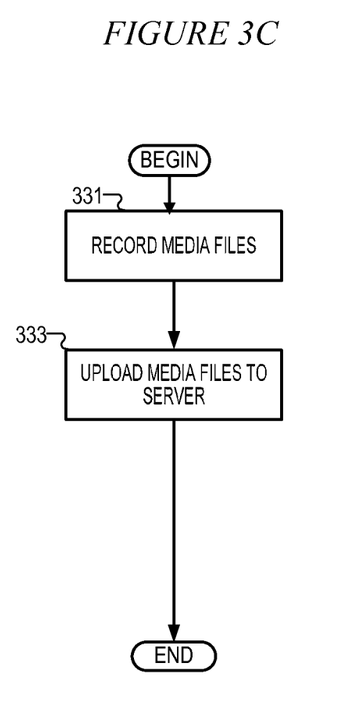
FIG. 3C is a flowchart of a process performed by a video source device in accordance with an illustrative embodiment of the invention.

FIG. 3C is a flowchart of a process performed by a video source device in accordance with an illustrative embodiment of the invention. A video source device can be the same source device that operates the process of either FIG. 3A or 3B. The video source device may record media files (step 331).

Next, the video source device can upload media files to an event server (step 333). Uploading a media file can include instructions that specify which URL hosts the media file(s). The event server can use that URL as the URL where it will summarize and/or fully render the media file(s). The event server can be, for example, client device 207, of FIG. 2A.

Accordingly, the client device may be used as a carrier for the user in a manner that permits the user of the client device to transcribe the URL to another client device for later review and downloading. As can be appreciated, a second guest to the wedding may simply verbally ask the user if he has the event URL, and write the event URL for later access as well.

Figure 4:
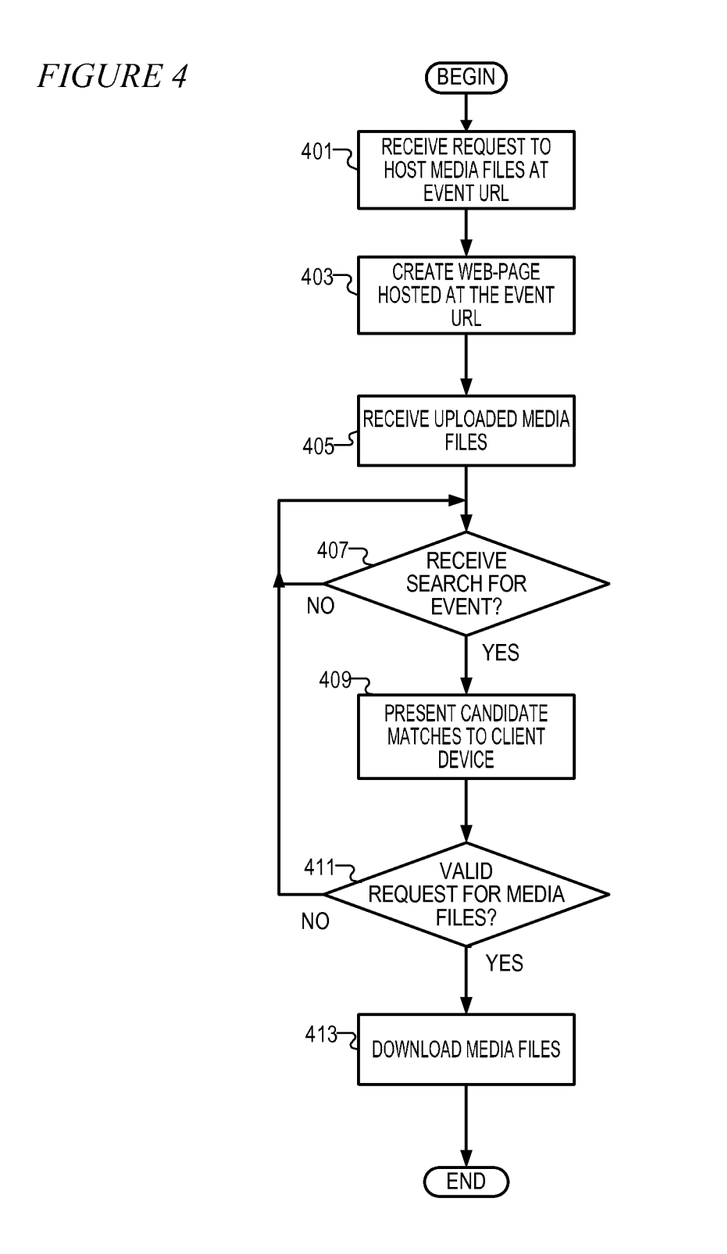
FIG. 4 is a flowchart of a process performed by an event server in accordance with an illustrative embodiment of the invention.

FIG. 4 is a flowchart of a process performed by an event server in accordance with an illustrative embodiment of the invention. Initially, the event server may receive a request to host media files at an event URL (step 401). Next, the event server may create a web-page hosted at the event URL (step 403). Next, the event server may receive uploaded media files (step 405). Next, the event server may receive a search for the event (step 407). Provided the search is received, for example, a search that includes names, dates and the like, the event server may present candidate matches to a client device (step 409).

Next, the event server may determine if there is a valid request for a media file (step 411). A valid request can be a user input that selects a candidate URL from a list formed at step 409. Accordingly, the event server may download media files to the client device (step 413). This download is in response to a positive determination at step 411. Processing may terminate thereafter. Any negative outcomes to steps 407 and 411 may cause the event server to iterate beginning at step 407.

Figure 5:
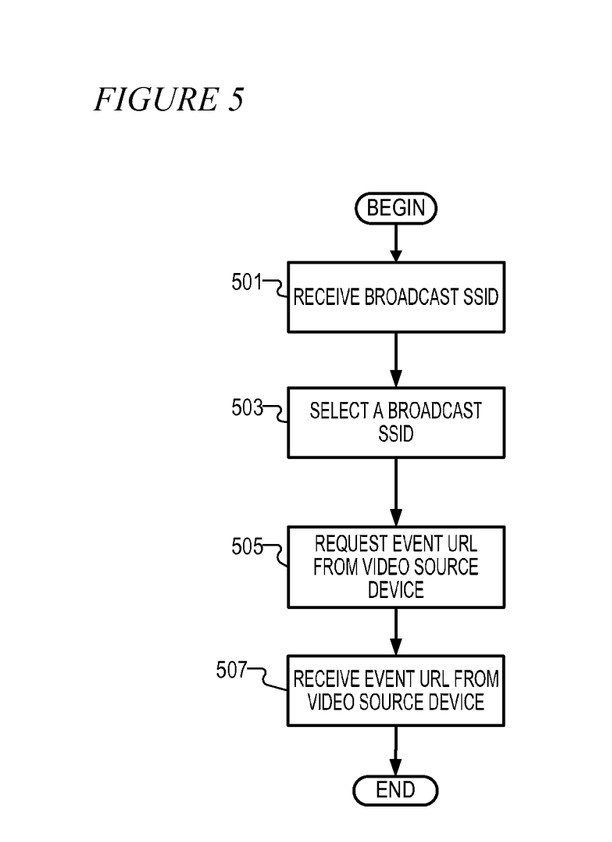
FIG. 5 is a flowchart of a process performed by a client device in accordance with an illustrative embodiment of the invention.

FIG. 5 is a flowchart of a process performed by a client device in accordance with an illustrative embodiment of the invention. The client device can be, for example, client device 207 of FIG. 2A. The client device may be within radio range of a source device broadcasting event URLs in the second scheme, explained above. For example, the client device may detect an SSID, "QQQ front row seats", among potentially other SSIDs. Next, the client device may select a broadcast SSID (step 503). Selecting a broadcast SSID can be trivial if there is only one SSID that contains the preset indicator, in this example "QQQ". However, in case multiple SSIDs have the preset indicator, the client device may select from among one of them, for example, as prompted by a user-input selection. Next, the client device may request an event URL from the source device or other source device (step 505). Finally, the client device may receive the event URL from the source device (step 507). Processing may terminate thereafter.

The illustrative embodiments permit guests at an event to coordinate with photographers and other event chroniclers. Rather than coordinate by interrupting the photographer at his work with a question, guests can solicit event URLs that reference the work that is to be posted. Soliciting or requesting the event URLs can take place using radio communications. A preset indicator permits a guest's client device to distinguish source devices from the more ubiquitous access points. Accordingly, the client device can record for the guest the event URL without the obtrusiveness of interrupting a performance in progress or disturbing the professional at work.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. For the purposes of this description, a computer-usable or computer readable storage device can be any tangible apparatus that can store the program for use by or in connection with the instruction execution system, apparatus, or device.

The computer-readable storage device can be an electronic, magnetic, optical, electromagnetic, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to announce file availability, the computer implemented method comprising a receive protocol:
   receiving, at a source device, an event conclusion time later than the current time, wherein the event conclusion time is input by receiving from a user an input for an event;
   receiving, at the source device, a user input Uniform Resource Locator (URL) to store a media file;
   uploading, from the source device, the media file to a server that hosts the URL;
   storing, by the source device, the user input URL to a configuration file;
   transmitting, by the source device, a Service Set IDentifier (SSID) comprising a preset identifier, wherein the preset identifier is unused in ubiquitous protocols that are not the receive protocol;
   determining that a local wireless request for the URL is received from a client device based on signal strength received at the client device being above a preset level, and in response, transmitting the URL; and
   determining whether the event is concluded, based on the event conclusion time; and
   in response to a determination that the event is concluded, terminating the transmitting of the SSID and the transmitting of the preset identifier, whereby terminating the preset identifier reduces clutter in a radio environment.

2. The computer implemented method of claim 1, wherein transmitting the URL further comprises transmitting a geographic description of the event.

3. The computer implemented method of claim 1, wherein the media file is a video encoded file.

4. The computer implemented method of claim 1, further comprising recording the media file.

5. The computer implemented method of claim 1, further comprising recording a photo as the media file.

6. A computer program product to announce file availability within a receive protocol, the computer program product comprising: a computer readable storage device having computer readable program code embodied therewith, the computer readable program code comprising:
   computer readable program code to receive, at a source device, an event conclusion time later than the current time, wherein the event conclusion time is input by a user inputting an input for an event;
   computer readable program code to receive, at the source device, a user input Uniform Resource Locator (URL) to store a media file;
   computer readable program code to store, by the source device, the user input URL to a configuration file;
   computer readable program code to transmit, by the source device, a Service Set IDentifier (SSID) comprising a preset identifier, wherein the preset identifier is unused in ubiquitous protocols that are not the receive protocol;
   computer readable program code to iteratively determine, by the source device, if a request for the URL is made by:
      computer readable program code to determine that a local wireless request for the URL is received from a client device based on signal strength received at the client device being above a preset level, and in response, transmitting the URL; and
      computer readable program code to determine whether the event is concluded, based on the event conclusion time; and
   computer readable program code to terminate the transmitting of the SSID and the transmitting of the preset identifier, whereby terminating the preset identifier reduces clutter in a radio environment, in response to a determination that the event is concluded.

7. The computer program product of claim 6, wherein computer readable program code to transmit the URL further comprises computer readable program code to transmit a geographic description of the event.

8. The computer program product of claim 6, wherein the media file is a video encoded file.

9. The computer program product of claim 6, further comprising computer readable program code to record the media file.

10. The computer program product of claim 6, further comprising computer readable program code to record a photo as the media file.

11. A data processing system comprising:
   a bus;
   a storage device connected to the bus, wherein computer usable code is located in the storage device;
   a communication unit connected to the bus; and
   a processor connected to the bus, wherein the processor is configured to execute computer usable code for announcing file availability within a receive protocol, the computer usable code, when executed by the processor, causes the processor to execute the steps:
   receive, at a source device, an event conclusion time later than the current time, wherein the event conclusion time is input by a user inputting an input for an event;
   receive, at the source device, a user input Uniform Resource Locator (URL) to store a media file;
   store, by the source device, the user input URL to a configuration file;
   transmit, by the source device, a Service Set IDentifier (SSID) comprising a preset identifier, wherein the preset identifier is unused in ubiquitous protocols that are not the receive protocol;
   determining that a local wireless request for the URL is received from a client device based on signal strength received at the client device, and in response, transmitting the URL; and
   determining whether the event is concluded, based on the event conclusion time; and to terminate the transmitting of the SSID and the transmitting of the preset identifier, whereby terminating the preset identifier reduces clutter in a radio environment, in response to a determination that the event is concluded.

12. The data processing system of claim 11, wherein in executing computer usable code to transmit the URL the computer usable code, when executed by the processor, further executes the step to transmit a geographic description of the event.

13. The data processing system of claim 11, wherein the media file is a video encoded file.

14. The data processing system of claim 12, wherein the computer usable code, when executed by the processor, further records the media file.

15. The data processing system of claim 12, wherein the computer usable code, when executed by the processor, further records a photo as the media file.

\* \* \* \* \*